United States Patent [19]

Mahler, II

[11] 4,456,382
[45] Jun. 26, 1984

[54] AGITATOR HUB

[75] Inventor: Carl P. B. Mahler, II, Avon Lake, Ohio

[73] Assignee: The B. F. Goodrich Company, Akron, Ohio

[21] Appl. No.: 463,373

[22] Filed: Feb. 3, 1983

[51] Int. Cl.³ .............................................. B01F 11/00
[52] U.S. Cl. .................................... 366/276; 366/285; 366/326; 366/327; 416/208; 416/239; 415/DIG. 3
[58] Field of Search ............... 366/276, 277, 278, 279, 366/285, 325, 326, 327, 330, 331; 415/DIG. 3; 416/142, 153, 208, 214 R, 239; 422/135, 259, 269

[56] References Cited

U.S. PATENT DOCUMENTS

| 2,382,535 | 8/1945 | Bauer | 416/208 |
| 3,074,820 | 1/1963 | Kunin | 422/269 |
| 4,285,637 | 8/1981 | Thompson | 416/208 |
| 4,345,877 | 8/1982 | Monroe | 416/239 |

FOREIGN PATENT DOCUMENTS 2610921  9/1977  Fed. Rep. of Germany ...... 416/208

Primary Examiner—Robert W. Jenkins
Assistant Examiner—Arthur D. Dahlberg
Attorney, Agent, or Firm—Joe A. Powell; Alan A. Csontos

[57] ABSTRACT

An agitator device for use in a reactor tank having a longitudinal shaft that is journaled in the tank and oscillated by an external power source. A hub assembly composed of an upper and lower cylindrical portion support a blade holder which is adjustable about an axis that is normal to the axis of the shaft. The upper and lower cylindrical portions of the hub assembly are clamped together to secure the blade holder in its adjusted position. The blade is pivotally adjustable on the blade holder about an axis that is normal to the axis of rotation or adjustment of the blade holder.

2 Claims, 4 Drawing Figures

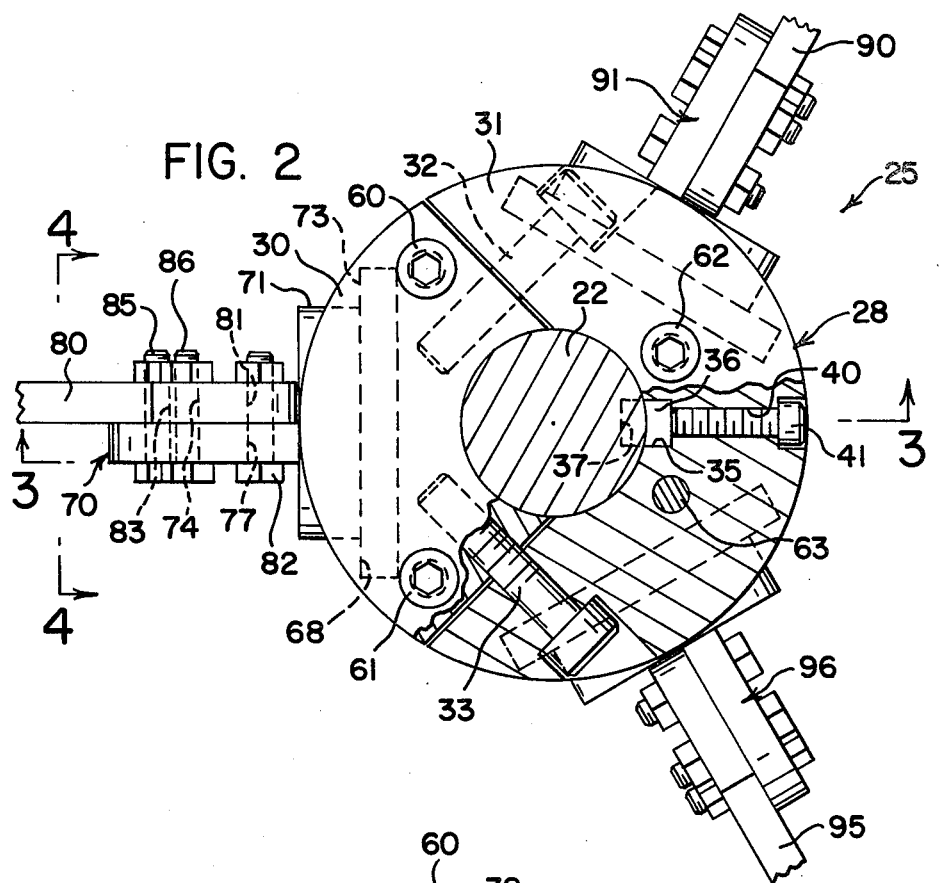
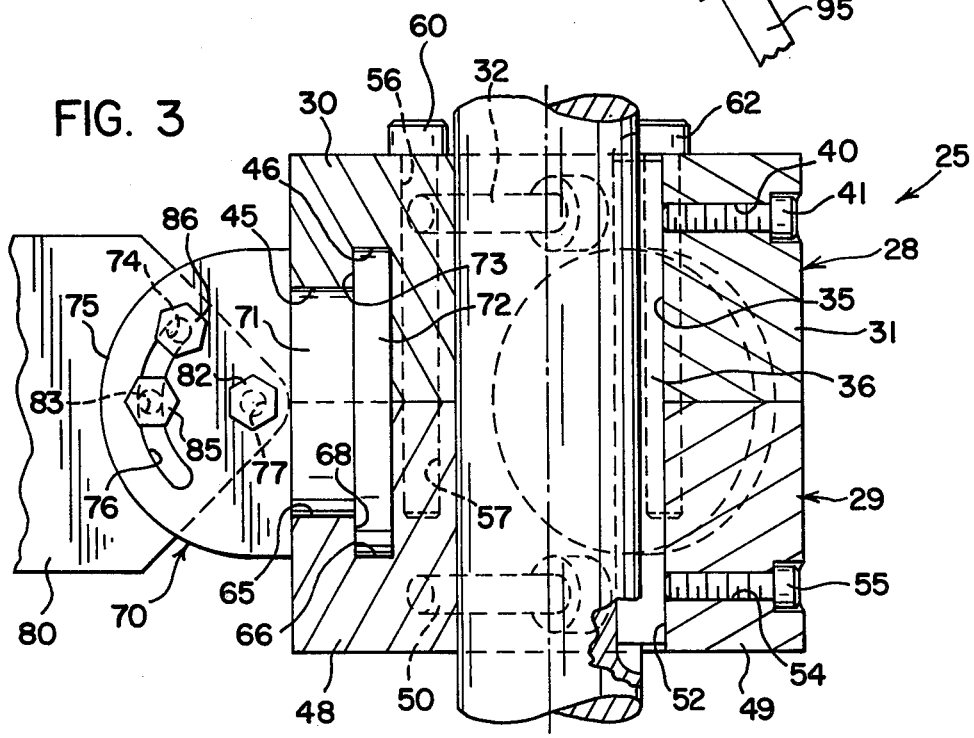

AGITATOR HUB

BACKGROUND OF THE INVENTION

Many chemical reaction vessels are equipped with agitation means for various reasons. Agitation is required in the suspension process for making polyvinyl chloride in order to keep the monomer in a dispersed state and also to assist in the cooling of this exothermic reaction. The amount and type of agitation can greatly change the properties of the polymer obtained from the reaction vessel. Agitation must frequently be changed if the desired properties of the product are changed.

Agitation in a chemical reaction vessel is normally achieved by a plurality of agitation blades permanantly attached to a hub which is attached to a shaft extending into the reaction vessel. These blades can vary in number, size and shape. Some are curved, some are at an angle, some are straight and flat. When a different form of agitation is required, the hub is removed from the shaft and another hub is bolted to the shaft. The new hub having a different set of agitator blades permanantly attached thereto.

This prior process requires a large number of different blade-hub combinations to cover a broad range of agitation requirements. It would be desirable to have a blade-hub combination that could be used for different agitation requirements. The present invention overcomes these objections by providing an agitation blade and hub assembly that permits adjustment of the blade in pitch as well as replacement of blade size in a minimum of down time.

SUMMARY OF THE INVENTION

This invention is directed to an agitator device for mounting on a rotatable rod within a reactor tank. An external power source is used to rotate the rod and the corresponding agitator device that is mounted thereon. The agitator device has a blade holder that is adjustably mounted thereon for adjustment about an axis that is normal to the axis of rotation of the rod. The blade holder has a blade adjustably mounted on the blade holder about an axis that is perpendicular to the axis of the blade holder.

BRIEF DESCRIPTION OF THE DRAWINGS

FIG. 2 is an enlarged plan view of the hub assembly and a portion of an agitation blade taken on line 2—2 of FIG. 1, with a portion broken away.

FIG. 3 is an enlarged cross sectional view of the hub assembly taken on line 3—3 of FIG. 2.

DETAILED DESCRIPTION OF THE INVENTION

Figure 1:
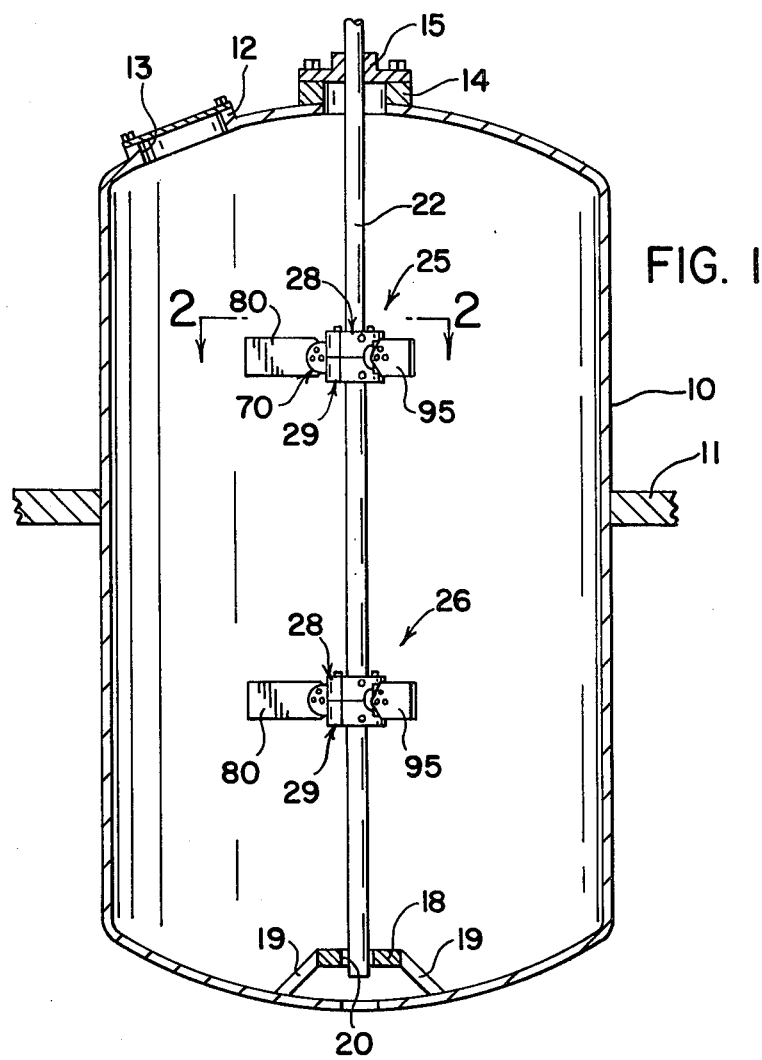
FIG. 1 is a side elevation view of a variable pitch agitation blade and hub assembly within a reactor tank, showing the tank in cross section.
Figure 4:
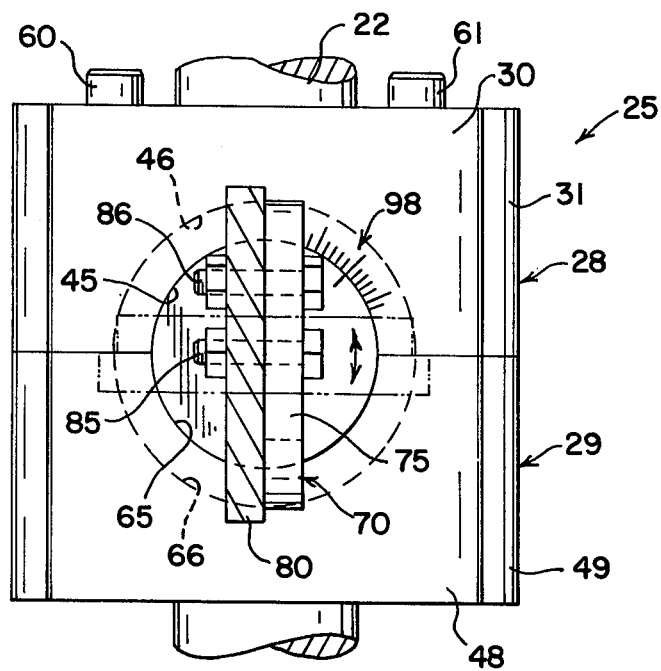
FIG. 4 is an enlarged side elevational view of a hub assembly with a portion of agitation blade.

Referring to the drawings, wherein the reference numerals designate like or corresponding parts throughout the several views, there is shown in FIG. 1 a reactor tank or vessel 10. The reactor tank 10 is suitably secured to a floor 11 extending downwardly therethrough. The upper portion of the tank 10 has a circular flange 12 to one side defining a manhole 13. The upper central portion of tank 10 has a flange 14 supporting a bearing number 15 with a central aperture therethrough. A bearing member 18 secured as by brackets 19 to the lower portion of tank 10 has a central aperture 20 in alignment with the central aperture in bearing member 15. A longitudinally extending rod 22 suitably driven from a power source not shown, enters tank 10 through the aperture in bearing member 15 and terminates in central aperture 20 of bearing member 18.

Suitably located at spaced locations on rod 22 are blade and hub assemblies 25 and 26. Assemblies 25 and 26 are alike in all respects, therefore only one blade and hub assembly 25 will be described. Assembly 25 has an upper annular portion 28 and a lower annular portion 29. Upper annular portion 28 consists of first arcuate section 30 and a second arcuate section 31 interconnected by bolts 32 and 33. Second arcuate section 31 is recessed on its inner periphery as at 35 to receive a locking block 36 that is adapted to engage a recess 37 in rod 22 to retain arcuate section 31 and the hub assembly 25 in position on rod 22. A threaded bore 40 extends through arcuate section 31 and connects the locking block 36 to the exteriol peripheral surface of arcuate section 31. A threaded bolt 41 journaled in threaded bore 40 is operative to move the locking block 36 into frictional engagement with rod 22 in a manner to be described. First arcuate section 30 has a first arcuate recess 45 communicating with a larger arcuate recess 46 to receive a blade holder to be described.

Lower annular portion 29 is similar in construction to the upper annular portion 28 in that it too is composed of two arcuate sections 48 and 49 that are held together by bolts 50 (only one shown). Arcuate section 49 is recessed on its inner periphery as at 52, which recess 52 is in alignment with recess 35. Recess 37 in rod 22 extends the full length of recesses 35 and 37 to accommodate locking block 36. Arcuate section 49 has a threaded bore 54 that extends from the recess 52 to the outer periphery of section 49. A threaded bolt 55 is threaded into bore 54 to provide means for securing the locking block 36 within recesses 35 and 52 of upper and lower annular portions 28 and 29. A threaded bore 56 (FIG. 3) in arcuate section 30 of upper annular portion 28 is in alignment with threaded bore 57 in arcuate section 48 of lower annular portion 29 to receive a bolt 60 which together with other similar bolts 61, 62 and 63 interconnect the annular portions 28 and 29 to form a unitary hub assembly 25.

Lower annular portion 29 has an arcuate recess 65 that is complimentary to arcuate recess 45 to define a circular bore. Lower annular portion 29 also has a second arcuate recess 66 that is complimentary to arcuate recess 46 to define a circular bore that is larger in diameter than the bore defined by recesses 45 and 65. Both of these bores are on the same axis defining an annular shoulder 68 therebetween.

Mounted within the recesses 45-65 and 46-66 is a blade holder 70 having a pair of stepped cylinderical portions 71 and 72 defining a shoulder 73 therebetween which abuttingly engages annular shoulder 68. An arcuate segment 75 is connected to cylindrical portion 71. Segment 75 has an arcuate recess 76 and a bore 77. The axis of bore 77 is the center of the arcuate recess 76.

An elongated rectangular shaped blade 80 having a bore 81 at one end thereof is in alignment with bore 77. Such bores 81 and 77 receive a bolt 82 about which blade 80 can be rotated. Blade 80 also has a pair of bores 83-74 which lie along the arcuate recess 76. Bolts 85 and 86 extend through bores 83 and 74 as well as the arcuate recess 76 thereby providing means for fixedly securing the blade 80 in its preselected position on blade holder 70. As seen in FIG. 3, blade 80 is arcuately contoured along its one end adjacent the blade holder 70 to facilitate its angular adjustment relative thereto. Blade holder 70 can be angularly adjusted relative to hub assembly 25 by rotating blade holder 70 about the axis of the bores defined by arcuate recesses 45, 46, 65 and 66 afterwhich the blade holder 70 is locked in its adjusted position by tightening bolts 60, 61, 62 and 63 which moves the respective upper and lower annular portions 28 and 29 of hub assembly 25 into locking engagement with each other. As seen in FIGS. 2 and 3, additional blades and blade holders 90, 91 and 95, 96 are disclosed and are constructed and mounted within hub assembly 25 in the same manner as blade 80 and blade holder 70. Additional blade holders or fewer blade holders may be mounted within such hub assembly.

In the operation and mounting of the hub assembly on the shaft 22, the vertical adjustment thereon is determined in cooperation with the vertically spaced recesses such as 37 on rod or shaft 22. The respective blade and blade holders are rotatably adjusted on the hub assembly 25 by loosening of the bolts 60, 61, 62, 63 and thence rotating the blade holders 70, 91, 96. To facilitate the adjustment of the blade holders to the desired position, indicia 98 is provided in the juncture of the hub assemblies with the blade holders. In this manner the blade holder's relative position can be repeated in accordance with prior operations achieve the prior known mixing result. The bolts 60, 61, 62, 63 are then tightened and the blade 80, 90, 95 are then adjusted about their respective pivots such as bolt 82 in cooperation with bolts 85 and 86.

Various modifications are contemplated and may obviously be resorted to by those skilled in the art without departing from the described invention, as hereinafter defined by the appended claims, as only a preferred embodiment thereof has been disclosed.

I claim:

1. An agitator device for a reactor tank having a longitudinally extending shaft that is subject to being oscillated about its longitudinal axis, a hub assembly fixedly mounted on said shaft, wherein said hub assembly has an upper cylindrical portion and a lower cylindrical portion, each of said cylindrical portions having a pair of complimentary arcuate recesses defining a pair of adjacent stepped bores with a common axis, means for securing said hub assembly on said shaft, a blade holder mounted on said hub assembly, said blade holder having a pair of adjacent cylindrical portions received by said adjacent stepped bores, and said blade holder being rotatably adjustable in said adjacent stepped bores about said common axis. Lock means on said hub assembly for fixedly securing said blade holder in its rotative adjusted position on said hub assembly, and a blade securely mounted on said blade holder wherein said blade is rotatably adjustably mounted on said blade holder about an axis that is normal to said axis of said hub assembly.

2. An agitator device for a reactor tank as set forth in claim 1 wherein said hub assembly has indicia thereon that is cooperative with said blade holder to provide a reading of the relative positions therebetween.

* * * * *

UNITED STATES PATENT AND TRADEMARK OFFICE
CERTIFICATE OF CORRECTION

PATENT NO. : 4,456,382

DATED : June 26, 1984

INVENTOR(S) : CARL P. B. MAHLER, II

It is certified that error appears in the above-identified patent and that said Letters Patent are hereby corrected as shown below:

In claim 1, line 22, delete the period after "axis." so that it reads ---axis--- and change the word "Lock" to read ---lock---.

Signed and Sealed this

Twelfth Day of August 1986

[SEAL]

Attest:

DONALD J. QUIGG

Attesting Officer

Commissioner of Patents and Trademarks